April 19, 1955 A. DAVISON ET AL 2,706,751

RELAXATION-OSCILLATOR RINGING AND TONE GENERATOR

Filed Sept. 19, 1949 5 Sheets-Sheet 1

INVENTORS
ALAN DAVISON
JAMES GORDON PEARCE
BY Lippincott & Smith.
ATTORNEYS

INVENTORS
ALAN DAVISON
JAMES GORDON PEARCE
BY Lippincott & Smith
ATTORNEYS

April 19, 1955 A. DAVISON ET AL 2,706,751

RELAXATION-OSCILLATOR RINGING AND TONE GENERATOR

Filed Sept. 19, 1949 5 Sheets-Sheet 3

INVENTORS
ALAN DAVISON
JAMES GORDON PEARCE
BY Lippincott & Smith
ATTORNEYS

INVENTORS
ALAN DAVISON
JAMES GORDON PEARCE
BY Lippincott & Smith
ATTORNEYS

INVENTORS
ALAN DAVISON
JAMES GORDON PEARCE
BY Lippincott & Smith
ATTORNEYS

United States Patent Office 2,706,751

Patented Apr. 19, 1955

2,706,751

RELAXATION-OSCILLATOR RINGING AND TONE GENERATOR

Alan Davison and James Gordon Pearce, Liverpool, England, assignors to Automatic Telephone & Electric Company Limited, Liverpool, England, a British company Application September 19, 1949, Serial No. 116,554

Claims priority, application Great Britain October 5, 1948

12 Claims. (Cl. 179—84)

Figure 1:
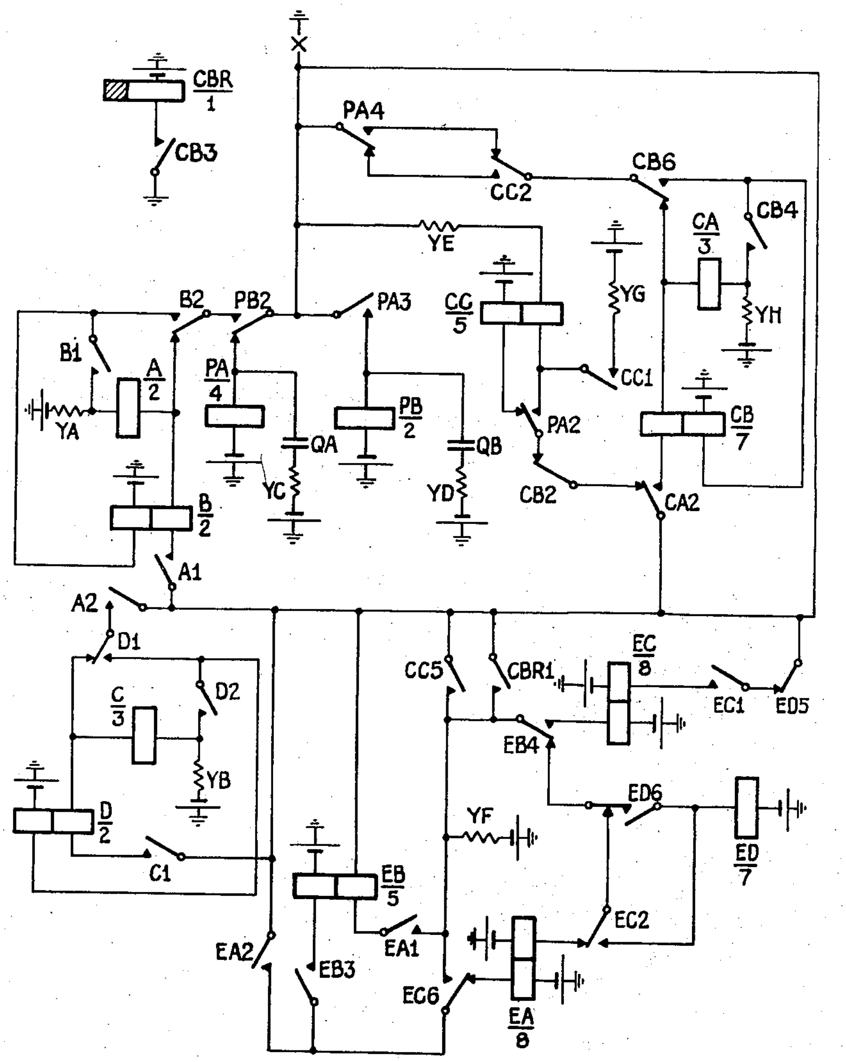

The present invention relates to telephone systems and the like and is more particularly concerned with means for generating the various alternating current signals, such as ringing potentials, tones and also subscriber's meter operating pulses and other pulses used on such systems.

In telephone exchanges the generation of ringing potentials, tones, meter pulses and the like has hitherto generally been effected by means of so-called ringing machines, the ringing current being derived from a motor driven generator or dynamotor. These machines, in addition to the slip rings, are fitted with a series of commutators which provide the various tones, and furthermore are fitted with reduction gearing to drive cams which actuate interrupter spring sets connected in the various outlet leads.

Each exchange is usually equipped with two ringing machines one of which is kept in reserve for use in the event of the failure of the other. On large exchanges the machine normally employed is driven from the public electric supply to reduce the drain on the exchange battery, while the standby machine is arranged to work from the exchange battery when the occasion arises. Particularly on large exchanges, the ringing machines take up a considerable amount of space and in addition to this more space is taken up by the control panel which embodies the heavy duty changeover switches, starter switches and the like.

The object of the invention is to provide an improved and compact means for providing ringing potentials, tones, meter pulses and the like.

According to the invention, electronic oscillators are provided in common to a plurality of connecting circuits for generating the alternating current signals, the outputs of certain of the oscillators being fed directly to signal leads while the modulated or unmodulated outputs of the other oscillators are fed intermittently to signal leads under the control of a relay set. This considerably reduces the size of the equipment involved and reduces the current drain to such an extent as to enable the equipment to be operated wholly from the exchange battery.

According to a feature of the invention, a multivibrator circuit is arranged to control switching means which serve to reverse the direction of current flow through the primary winding of a transformer in synchronism with the operation of the multivibrator circuit to provide alternating signal current in the secondary winding of the transformer.

According to another feature of the invention, a multivibrator circuit is provided with switching means in the anode circuit of each thermionic valve in said circuit, the switching means having contacts associated with the primary winding of a transformer in such a manner as to reverse the direction of current flow through said primary winding substantially immediately upon the operation of said switching means whereby an alternating current signal having a frequency determined by the frequency of the multivibrator circuit is provided in the secondary winding of the transformer.

According to yet another feature of the invention, a multivibrator circuit controls a tuned output circuit from which the alternating current signal is obtained and the multivibrator circuit is adjusted to a frequency slightly different from the desired frequency, synchronisation of the multivibrator circuit being effected by means of a feedback connection from the tuned output circuit.

According to a further feature of the invention, busy, number unobtainable and continuous tones are generated by a single electronic oscillator having two output circuits, one for supplying number unobtainable and continuous tones and the other for supplying busy tone, means being provided to prevent one output circuit reacting on the other in order to prevent a heavy busy tone load from affecting the level of the other tones.

According to a further feature of the invention, ringing current is generated in the centre-tapped primary winding of a transformer by switching the current flow alternately through each winding to the centre tap, the connection from the centre tap including the primary of a second transformer for the generation of dial tone having a frequency of twice the ringing current.

The arrangements provided by the invention are very suitable for use in small exchanges, but in larger exchanges there is a possibility of the equipment being overloaded. In order to avoid this difficulty, according to a further feature of the invention, the final selectors in an exchange are divided into a plurality of groups and ringing current is generated by the electronic control of switching means which serve to reverse the current flow in the primary windings of a plurality of transformers provided on the basis of one for each group of final selectors and interrupted ringing current is provided by connecting the secondary winding of the transformer successively to a plurality of signal leads each serving a subgroup of final selectors.

The invention is also concerned with improved arrangements for operating an inductive responding device, such as a relay, under the control of the current flow through a thermionic tube or tubes and is particularly concerned with arrangements in which the inductive responding device is controlled by the current flow through two thermionic tubes connected to operate as a relaxation circuit. The object of this aspect of the invention is to cause the relay to operate with very little delay after the changeover of the condition of the thermionic tubes and according to this feature of the invention, in a relaxation circuit including two thermionic tubes, at least one polarised relay is provided having a winding in each anode circuit the connections which determine the relaxation operation of the circuit being made to other electrodes of the tubes than the anodes.

It will be understood that the circuit will operate satisfactorily using a single polarised relay but a preferred arrangement employs two relays of which opposite windings of each of the two relays are included in the anode circuit of each of the two tubes.

Figure 5:
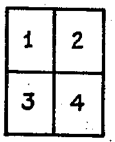
Figure 2:
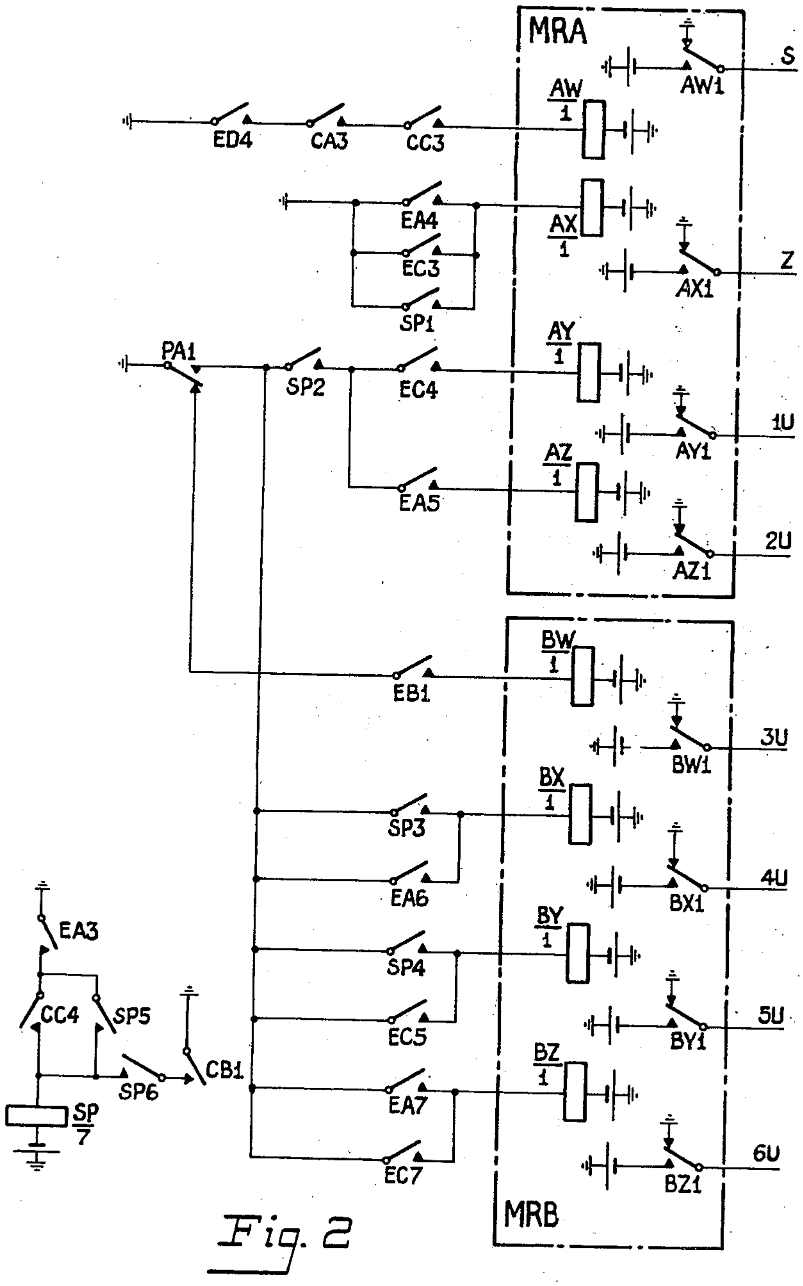
Figure 6:
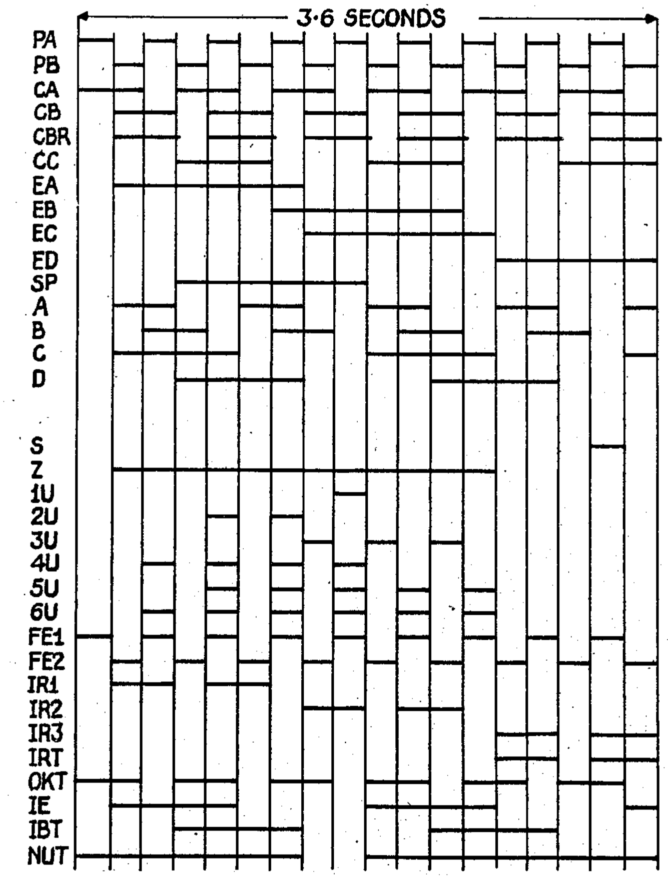
Figure 7:
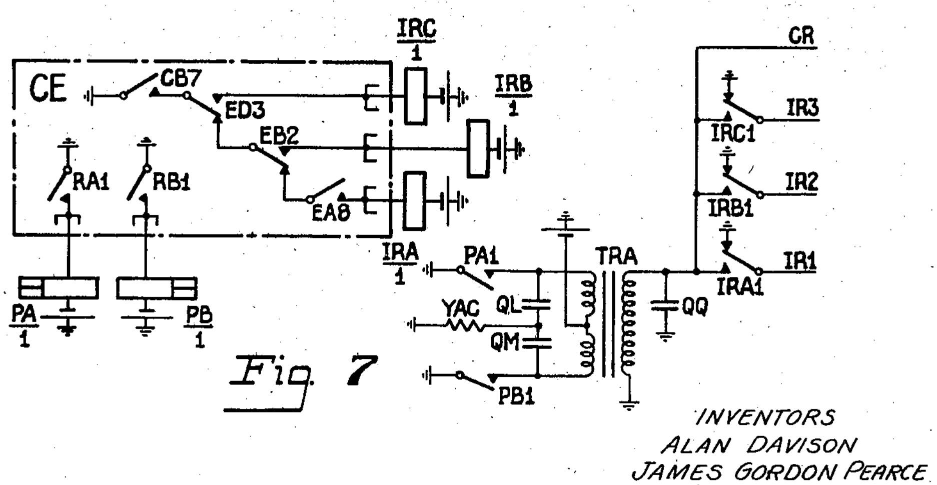

The invention will be better understood from the following description of methods of carrying it into effect and should be read in conjunction with the accompanying drawings. Of the drawings Figs. 1 to 4, which should be arranged according to Fig. 5 appearing on the same sheet as Fig. 1, is the circuit of a ringing current, tone and meter pulse group for use on comparatively small automatic telephone exchanges. Fig. 6 shows the relative conditions of certain relays in the said group over a period together with the various pulses generated thereby. Fig. 7 shows a modification of the circuit arranged to cater for the greater supply of ringing current which would be required for larger exchanges.

The circuit of the ringing current tone and meter pulse group, shown in Figs. 1 to 4 and primarily intended for use in rural automatic telephone exchanges serving a comparatively small number of subscribers (say a few hundreds) will now be described in conjunction with Fig. 6 which is a graphical representation of the operating sequence of the relays and of the various pulses derived from the relays. The vertical lines in Fig. 6 are spaced to represent intervals 200 milliseconds and the symbols in the left-hand column correspond with relays or leads bearing like symbols in the circuit. Additionally the thick horizontal lines in Fig. 6 are indicative, as the case might be, of the operated periods of the appropriate relay or of the periods during which certain signals are applied to the corresponding leads.

Certain conductors in the circuit extending to earth are broken by an X which is intended to indicate that those paths are normally disconnected until the exchange equipment is taken into use by a subscriber, whereupon the circuit proceeds to function. The sequence of operations of the relays in the circuit is built up from two interacting relays PA and PB, the former being shunted by capacitor QA and resistor YC and the latter being shunted by capacitor QB and resistor YD. These shunt paths ensure that the relays shall be slow to release upon disconnection. When the circuit is taken into use relay PA operates over contacts PB2 whereupon a circuit is completed by contacts PA3 to operate relay PB. Relay PA then releases slowly and in turn disconnects relay PB, which also releases slowly and causes the whole process to be repeated. Relays PA and PB are arranged to function in such a manner that the contacts of relay PA are alternately operated and released for periods of substantially 200 m. secs. Furthermore it will be convenient to assume, although it may not be strictly correct, that relay PB functions in a complementary manner to relay PA. Thus it may be assumed that, while relay PB is so functioning, contacts PB1 cause complementary earth pulses of 200 m. secs. to be applied to the flicker earth leads FE1 and FE2.

Meantime, as relay PA proceeds to operate and release it controls the conditions of relays CA, CB, CBR, CC, EA, EB, EC, ED and SP which perform a predetermined cycle of operations during each 3.6 seconds period. The cycle of operations is set up in accordance with well known circuit principles and is briefly described hereunder in stages according to the condition of relay PA.

*First operation.*—Contacts PA4 operate relay CA in series with resistor YH, whereupon contacts CA2 apply a short circuit to the left-hand winding of relay CB.

*First release.*—The short circuit is removed from relay CB and that relay now operates over contacts CA2 which also provide a holding current for relay CA. Contacts CB6 disconnect the original path to relay CA, prepare an alternative hold path for relay CB, and together with contacts CB4 prepare to short circuit relay CA. Contacts CB3 operate the slow-to-release relay CBR which at contacts CBR1 extends earth over contacts EB4, ED6 and EC2 to operate relay EA by its upper winding. Relay EA holds over contacts EA2.

*Second operation.*—Relay CA and the left-hand winding of relay CB are short circuited, consequently relay CA releases but relay CB remains operated on the right-hand winding. Contacts CA2 prepare a circuit to relay CC.

*Second release.*—Relay CB releasing due to disconnection at contacts PA4, disconnects relay CBR and at contacts CB2 permits relay CC to operate over its left-hand winding. Contacts CC1 provide an alternative hold circuit for relay CC in series with resistors YG and YE. Contacts CC2 operating cause relay CA to operate for a second time. Contacts CC4 operate relay SP which holds over contacts SP5 and is subsequently controlled by relay contacts EA3 and CB1.

*Third operation.*—Relay CB operates and relay CA holds in series. Relay CBR again operates.

*Third release.*—Relay CA releases due to short circuit but relay CB remains operated on its right-hand winding.

*Fourth operation.*—Relay CB, disconnected at contacts PA4, releases and is followed by relay CBR. Contacts CB2 with contacts PA2 operated, apply a short circuit to the right hand winding of relay CC which releases, whereupon contacts CC5 together with contacts CBR1 disconnect the upper winding of relay EA and remove the short-circuit from the right-hand winding of relay EB, consequently the latter relay operates and then holds over contacts EB3. Contacts CC2 enable relay CA to operate a third time.

*Fourth release.*—Relay CB operates and relay CA holds in series, and relay CBR re-operates. Relay EC is operated over its lower winding by contacts CBR1 and provides a self-holding circuit at contacts EC1. Contacts EC6 release relay EA.

*Fifth operation.*—Relay CA releases due to short circuit.

*Fifth release.*—Relays CB and CBR release in turn. Relay CC is operated by contacts CB2 over its left-hand winding and then holds by way of contacts CC1. Relay SP is released by contacts CB1. Relay CA is again operated over contacts PA4, CC2 and CB6.

The cycle of operations continues after the manner described and it will be apparent that relays CA and CB are each repetitively operated for 400 m. secs. and released for 200 m. secs., relay CB being delayed by 200 m. secs. in relation to relay CA. Furthermore relay CC is alternatively operated and released for periods of 600 m. secs., the initial operation being effective approximately 600 m. secs. after the initial operation of relay PA.

Apart from relays CA, CB and CC, which continue to function after the manner described, the condition of the relays controlled by relay PA remains unchanged after the fifth release of relay PA until the latter relay operates for the seventh time in the cycle. Thereupon relay CB is released by contacts PA4, relay CBR also releases, and relay CC is released by the application of a short circuit to the right-hand winding. Relay CA therefore re-operates, and relay EB, previously maintained over its left-hand winding from earth by way of contacts CC5, EC6 and EB3, is released at this stage by contacts CC5.

When relay PA releases for the seventh time relay CB again operates in series with relay CA. Relay CBR also reoperates and consequently relay ED operates from earth extending over contacts CBR1, EB4, ED6 and EC2. Relay ED provides a self-holding circuit at contacts ED6, and at contacts ED5 releases relay EC. Relay ED remains operated until the commencement of the next 3.6 seconds cycle whereupon relay PA operating causes relays CB, CBR and CC to release, therefore relay ED disconnected at contacts CC5 and CBR1 also releases. The period of slight overlap between the closure of contacts CC5 and the opening of contacts CBR1 ensures that the circuit to relay ED is maintained at the eighth release of relay PA when CBR releases and CC operates as shown in Fig. 6.

Consider now the effect of certain of the above mentioned relays with regard to the generation of meter pulses and their associated S and Z pulses. These pulses will be derived from contacts of two so-called multi-relay units MRA and MRB, for example of the type described in U. S. patent application Serial No. 664,782 filed by George Thomas Baker on April 28, 1946, each comprising four operating coils which control separate contact springs which are assembled on a common support member to form a compact integral unit. The S pulse is produced towards the end of each 3.6 second cycle during that 200 m. secs. period when relays CA CC and ED are in the operated condition simultaneously. During that period relay AW is operated, over contacts ED4, CA3 and CC3, to substitute earth on the S lead by battery. The Z pulse which is of 2.4 secs. duration is produced at lead Z while relay AX is operated by any of relays EA, EC and SP. The one unit meter is applied to lead 1U by relay AY which is operated for 200 m. secs. while relays PA, SP and EC are in the operated state together. Two meter pulses are applied to lead 2U by relay AZ which is operated on the two occasions when the operated conditions of relays PA, SP and EA coincide. Three meter pulses are produced on lead 3U by relay BW which operates each time relay PA is normal while relay EB is in the operated state. Four meter pulses are connected to lead 4U by relay BX which is operated once upon each operation of relay PA while one or both of relays EA and SP are operated. Five meter pulses are connected to lead 5U by relay BY which operates on the five occasions when relay PA operates whilst one or both of relays SP and EC are operated. Finally six meter pulses are extended to lead 6U by relay BZ which is dependent, for each operation, upon relay PA being operated during the period when one or both of relays EA and EC are operated. The relative disposition of the various meter pulses is clearly shown in Fig. 6. It may be pointed out that, when the contacts of the multi-relays are in the normal condition, earth is connected to the appropriate outgoing lead, and that this arrangement is of advantage on certain types of exchange where as on others it may not be required and may be dispensed with. The multi-relays, or any normal relays which might be used instead, are not of course completely essential to the circuit but they do serve the important function of segregating negative battery from the complicated arrangement of interrupting relay contacts so as to reduce the possibility of short-circuits.

Reference will now be made to the function of certain of the above mentioned interacting relays with regard to distributing the interrupted ringing and tone potentials.

It may be assumed at this stage continuous ringing potential is provided by transformer TRA, the potential is extended to interrupted ringing lead IR1 in the form of two 400 m. secs. bursts separated by intervals of 200 m. s. during each cycle. These bursts are dependent upon relays CB and EA being operated whilst relays ED and EB are released, and the first becomes effective 200 m. secs. after start of the cycle. A second interrupted ringing lead IR2 is connected to the ringing potential source for two similar periods dependent upon relays CB and EB being operated and relay ED being released at the same time. Yet a third lead IR3 has the ringing potential connected to it for similar periods dependent upon relays CB and ED being operated together. It should be noted that the three before mentioned leads are connected to earth while the ringing potential is disconnected to eliminate pick-up effects between the conductors. Furthermore Fig. 6 discloses that the pairs of bursts of interrupted ringing potential are equidistantly displaced throughout the cycle in accordance with known practice in order that transformer TRA shall not be overloaded.

Interrupted ringing tone and test line OK tone, which may be assumed to be derived from a continuous tone signal provided by transformer TRD, are extendable to leads IRT and OKT respectively. The first tone is connected during each cycle for two 400 m. secs. periods corresponding to the simultaneously operated conditions of relay CB and ED, while the latter tone is repeatedly 400 m. secs. on and 200 m. secs. off as determined by relay CA. Lead IRT is connected to earth, when the tone potential is disconnected to eliminate pick-up troubles.

NU (number unobtainable) tone is obtained from a continuous tone signal appearing at transformer TRB and is only disconnected from lead NU for that period of 400 m. s. when relays EC and EP are both in the operated state.

Now while the foregoing sequence of relay operations is taking place under control of relay PA a further sequence is set in operation under control of relay PB. The chain of relays so controlled comprises relays A, B, C and D of which the first two are included in a circuit similar to that of relays CA and CB already mentioned. It follows that the condition of said relays bears a similar relationship to the condition of relay PB as relay CA and CB did to relay PA. Additionally upon the first operation of relay PB, relay C operates over contacts A2 and D1 and in series with resistor YE. Later upon the second release of relay PB, the consequent release of relay A enables relay D to operate in series with relay C which holds until the third operation of relay PB. On the fourth operation of relay PB relay A releases whereupon contacts A2 disconnect the left-hand winding of relay D which releases. It will now be apparent that the condition of relays A, B, C and D bear a fixed relationship to the conditions of relay PB in accordance with Fig. 6 and a study of the circuit shows that the whole process is repetitive although it is not bound to the beforementioned 3.6 seconds cycle.

Relay C, which is operated and released for substantially equal periods of 800 m. secs., affects the output of the circuit in that contacts C3 extend interrupted earth pulses to lead IE, while contacts C2 connect the continuous tone signal derived from transformer TRC to the interrupted busy tone lead IBT for recurrent periods of 800 m. secs. Earth is connected to lead IBT during the complementary 800 m. secs. periods to obviate pickup troubles.

Reference will now be made to the generation of the ringing potentials. The symmetrical multivibrator MV comprises a pair of power pentode tubes VA and VB preferably Mullard type UL41, and is substantially similar to that described in British Patent No. 657,063 in that the coils of the high speed relays RA and RB are electron coupled to the oscillatory circuit by inclusion in the anode circuits of tubes VA and VB respectively of which the cathode, control grid, and the screen grid (or auxiliary anode) of each function as triodes. The auxiliary anode of each tube is back-coupled to the control grid of the partner tube in each case, and by a suitable choice of components the multi-vibrator is arranged to have a natural frequency of oscillation of say just below 25 cycles per second. When tube VA is conducting relay RA is operated, and when VB is conducting relay RB is operated so that the said relays are operated for substantially equal and complementary periods in each cycle. Consequently relay contacts RA1 and RB1 (Fig. 7) cause the operation of relays PA and PB for the same equal and complementary periods. Contacts PA1 and PB1 which are made substantially spark-less by the inclusion of capacitors QL and QM and resistor YC, alternately energise the upper and lower halves of the primary winding of the step-up transformer TRA in series with the primary of transformer TRE. The resultant alternating potential, of approximately 75 volts R. M. S. value at 25 C. P. S., developed at the secondary winding of transformer TRA is extended to the continuous ringing lead CR and to the interrupter ringing leads, IR1, IR2 and IR3, in accordance with beforementioned relay operations. Now the secondary winding of transformer TRA is shunted by capacitor QQ which is primarily included to ensure that the wave form of the output is reasonably smooth and moreover that the voltage is not unduly affected by variations in the load. However capacitor QQ together with transformer TRA comprises a circuit tuned to 25 C. P. S. and it will be apparent that if precautions are not taken to ensure that the multivibrator MV is synchronised with the said tuned circuit the output ringing potential will be mutilated and excessive sparking or arcing will occur at contacts RA1 and RA2. Such precautions are therefore taken in that as previously stated the natural frequency of the multivibrator is arranged to be slightly under 25 C. P. S., and the tuned circuit is coupled by way of capacitor QR to the grid of tube VB. It follows therefore that a positive going pulse is applied to the grid of the tube VB at the appropriate instant in each cycle of the output to cause that tube to become conducting thereby to ensure that the multivibrator remains locked into a frequency of 25 C. P. S. and in suitable phase with the tuned circuit comprising transformer TRA and capacitor QQ.

Figures 3, 3A:
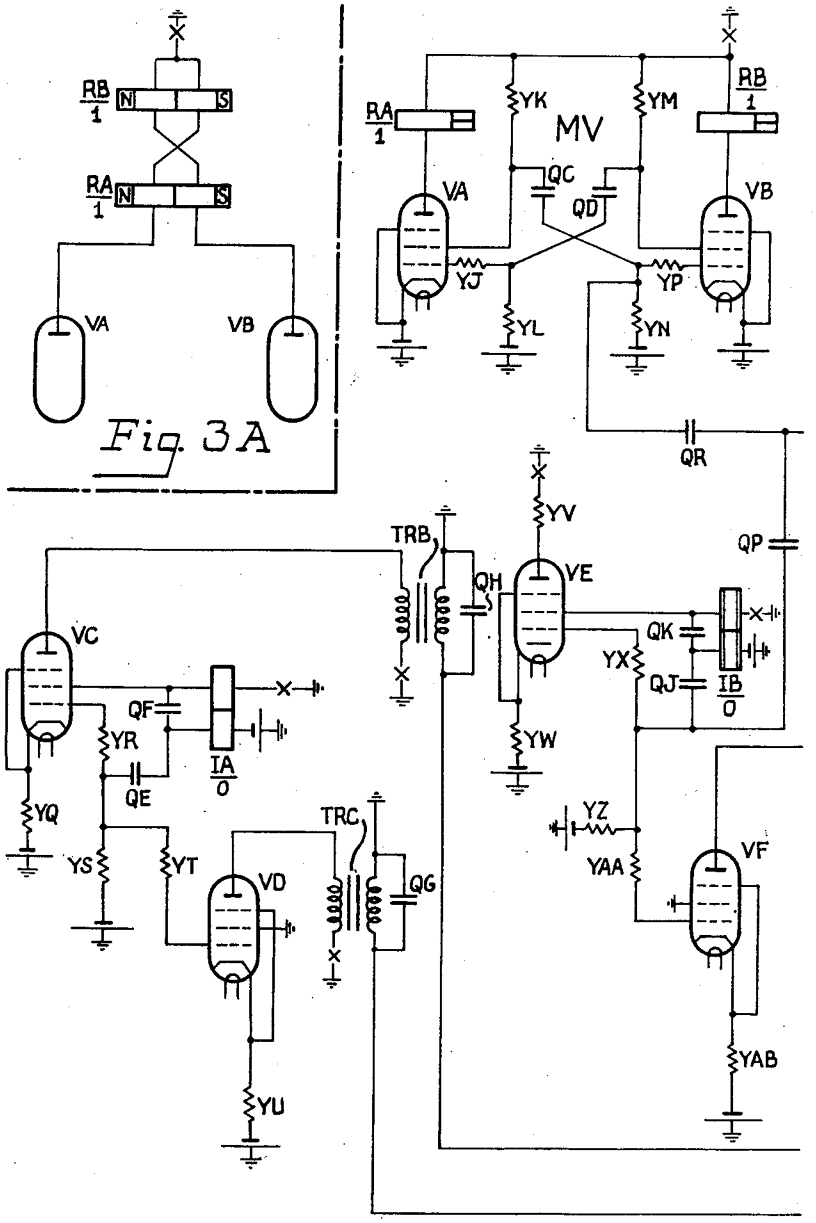
Figure 4:
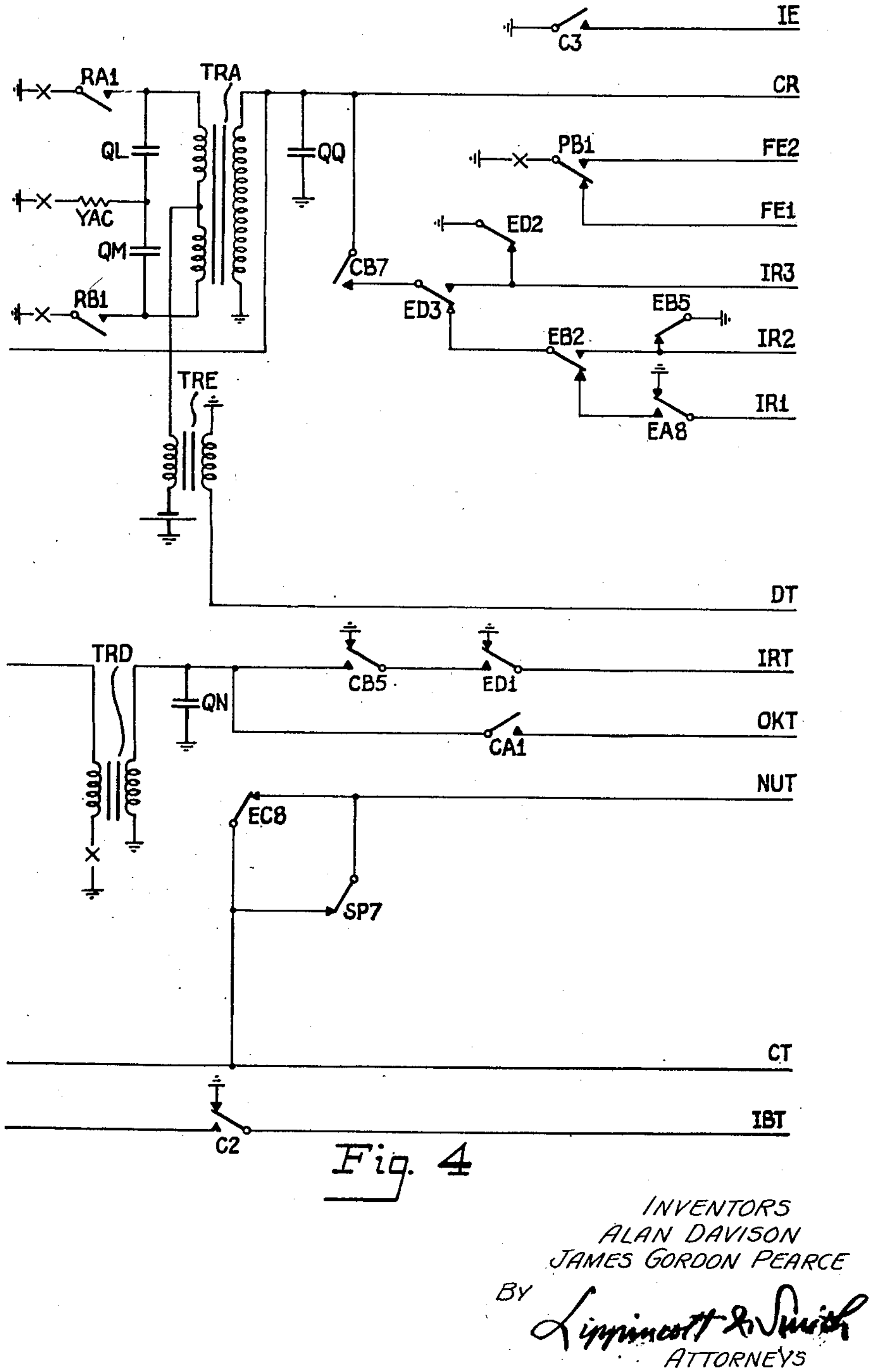

An alternative arrangement of the multivibrator is shown in Fig. 3A. This arrangement, which is otherwise similar to that already described, employs polarised relays embodying actuating coil assemblies with two balanced windings. The anode circuit of each tube VA and VB includes one winding of both relays, said windings being of the opposite sense. The relays are preferably of the type polarised by a permanent magnet, and the armature of each has two positions of stable equilibrium. Consequently when tube VA is conducting the relays are urged into opposite states of stable equilibrium in that contacts RA1 are closed and contacts RB1 are opened. Conversely when tube VB is conducting the conditions of the relays are transposed. By this arrangement the action of the relays is more positive since the movement of the relay armatures in one direction is not dependent upon the tension of the contacted springs.

As regards the dialling tone potential, this is connected to lead DT by transformer TRE the primary winding of which is energised by contacts RA1 and RB1 as previously described. The output waveform is characterised by short pulses recurring 50 times per second i. e. twice the frequency of the ringing potential.

Continuous tone and N. U. (number unobtainable) tone, transmitted over leads CT and NU respectively, are produced by the electron coupled oscilaltor embodying the power pentode tube VC and the resonant circuit comprising the balanced-winding retard IA and capacitor QF. The auxiliary grid of the tube is connected to the upper winding of retard IA while the lower winding is coupled to the tube control grid over capacitor QE and resistor YR. The tube anode load is constituted by the primary winding of transformer TRB. The transformer secondary winding, which is shunted by capacitor QH to ensure a reasonably constant output under varying load conditions and also to tend to remove any harmonics which may be present, extends directly to lead CT whereas lead NUT is interrupted for 400 m. secs. in every 3.6 secs.

Busy tone, connected over lead IBT, is also a 400 C. P. S. tone but has on and off periods of 800 m. secs. The same oscillator as that producing the continuous tone is employed and the common point of resistors YR and YS in that circuit extends over resistor YT to the control grid of the amplifier tube VD. Consequently the amplified 400 C. P. S. signal appears across the primary winding of transformer TRC, the secondary of which connects with the appropriate leads and is shunted by capacitor QG which performs a similar function to capacitor QH. It may be noted that in general the busy tone load will be great compared with that of the continuous and N. U. tones and it therefore follows that, by divorcing the output paths of the two circuits, the application of the busy tone load upon each operation of contacts C2 is prevented from reducing the level of the continuous and N. U. tones.

Another oscillator involving the pentode tube VE, and being somewhat similar to that described, is employed in producing a 133 C. P. S. potential for interrupted ringing tone. In this instance the tuned circuit is constituted by the balanced windings retard IB and capacitor QK. The oscillator output is drawn from capacitor QJ and extends over resistor YAA to the grid of the amplifier tube VF which has the primary winding of transformer TRD included in its anode circuit. Meantime the 25 C. P. S. potential applied to lead CR by transformer TRA is tapped by way of capacitor QP which connects with the upper end of resistor YAA. Thus the signal appearing across the primary winding of transformer TRD is a function of the 133 C. P. S. signal modulated by the 25 C. P. S. signal, and this modulated sig- is extended by the transformer to lead IRT after being duly interrupted by contacts CB5 and ED1.

Transformer TRD is shunted by capacitor QN which functions after the manner of capacitors QH and QG.

The circuit hereinbefore described is primarily intended for use on telephone exchanges serving a comparatively small number of subscribers. However as far as the various tones and meter pulses and the like are concerned a much larger number of subscribers can be catered for with little, if any, alteration to the circuit, but the generation and distribution of the ringing potentials presents a problem insofar as a single transformer might be subject to overload. The arrangement outlined in Fig. 7 is therefore intended to cater for larger exchanges of say 10,000 lines. For the purpose of interrupted ringing current supply, the final selectors on the exchange are divided into groups each associated with say 1,000 subscribers' lines, while for other purposes the circuit already described remains common to the whole exchange.

In the arrangement shown in Fig. 7 the contacts RA1 and RB1, of the high speed relays associated with the multivibrator MV in the common equipment CE, connect over common leads to 10 pairs of high speed relays such as PA and PB. The contacts, PA1 and PB1, of each pair of the latter relays energise a transformer TRA in a manner similar to that already described in connection with relays PA and PB so that a 25 C. P. S. potential is produced at the secondary of a transformer TRA and is extended directly to lead CR. Meantime contacts CB7, ED3, EB2 and EA8 of the relays in the common equipment, instead of distributing the interrupted ringing potentials directly, are arranged appropriately to control ten sets of relays such as IRA, IRB and IRC over common leads. The contacts of these relays, which may be of the aforesaid multi-relay type, in turn are each associated with one of the leads IR1, IR2 and IR3 extending to sub-groups of one of the groups of final selectors. It may be noted that common relays each having a plurality of contact units, may be used instead of the plurality of groups of relays such as IRA, IRB and IRC.

In an alternative arrangement to that shown in Fig. 7 the multivibrator is taken out of the common equipment and a separate multivibrator and associated transformer is provided to supply each group of final selectors. Relays IRA, IRB and IRC may then be provided on the same basis as shown in Fig. 7.

It will be apparent to those versed in the art that arrangements along well-known lines for determining a faulty condition, with respect to the supply ringing currents, within the equipment and for the bringing into use of standby equipment in case of fault might well be included.

The arrangement as described with regard to the generation and supply of ringing currents and the various tones and meter pulses for large telephone exchanges lends itself to the introduction of a physically compact, self contained and flexible equipment. Indeed a single relay type rack say 3 feet wide and 6 feet high may suffice to mount the equipment serving a 10,000 line exchange. Such a rack might comprise one shelf providing tone testing arrangements and control keys and the like, and a second shelf embodying the common tone and pulse equipment, together with a plurality of other shelves, which may be added as required, each employed in connection with ringing currents and provided on the basis of one shelf per (say) 1,000 subscribers' lines.

In further connection with the generation and supply of ringing potentials for large exchanges a common and completely electronic arrangement may be employed. In such an arrangement a tube oscillator even of the multivibrator type can be employed to drive an amplifier designed to provide the necessary output, the amplifier output being interrupted for example by relays after the manner described earlier.

We claim:

1. An arrangement for generating alternating current signals for telephone exchanges comprising electronic means including a multivibrator circuit having two thermionic tubes for generating a square waveform, a transformer having primary and secondary windings, a source of direct current connected to said primary winding and switching means including a pair of high-speed electromagnetic relays located one in the anode circuit of each tube so as to be controlled by said square waveform generator for reversing the flow of current from said source through said primary winding whereby an alternating current is generated in the secondary winding.

2. An arrangement for generating alternating-current signals for telephone exchanges comprising an electronic multivibrator circuit having two thermionic tubes for generating a square waveform, a transformer having primary and secondary windings, a source of direct current connected to the primary winding and switching means including a pair of magnetically polarized relays having balanced windings, oppositely acting windings of said relays being located in the anode circuit of each tube so as to be controlled by said square waveform generator for reversing the flow of current from said source through the primary winding to generate an alternating current in the secondary winding.

3. A circuit arrangement for generating alternating current signals for telephone exchanges comprising a first transformer having a center-tapped primary winding and a secondary winding, a source of direct current connected to said center tap, means for switching the current flow from said source alternately through the two halves of said primary winding whereby an alternating current is generated in said secondary winding, and a second transformer having a primary winding connected between said source and said center tap whereby an alternating current is generated in the secondary winding of said transformer having twice the frequency of the alternating current generated in said first secondary winding.

4. A ringing current and tone generator for telephone exchanges comprising an electron-coupled thermionic tube oscillation having at least an anode, inner and outer control grids and a cathode, a first load circuit including said anode for supplying number-unobtainable and continuous tones, a second load circuit including one of said control grids for supplying busy tone and means for preventing a heavy drain on said busy tone load from affecting the level of the number-unobtainable and continuous tones.

5. A ringing and tone generator as claimed in claim 4 wherein said means comprises a thermionic tube amplifier connected between said inner control grid and said second load circuit.

6. A ringing and tone generator for large capacity telephone exchanges having a plurality of final selectors divided into groups and subgroups comprising a plurality of transformers each serving a group of final selectors and each having a primary winding and a secondary winding, a source of direct current connected to each of said primary windings, electronic control means, switching means operated under the control of said electronic control means for reversing the current flow from each source through each primary winding whereby an alternating current is generated in each secondary winding, a plurality of signal leads each serving a subgroup of final selectors and means for connecting the secondary winding of each transformer successively to the signal leads serving the subgroups comprised within the group of final selectors served by said transformer.

7. A ringing and tone generator as claimed in claim 6 wherein said electronic control means comprises a single multivibrator circuit which controls said plurality of transformers.

8. A ringing and tone generator as claimed in claim 6 wherein said electronic control means comprises a plurality of multivibrator circuits each controlling an associated one of said plurality of transformers.

9. A relaxation circuit comprising two thermionic tubes each having an anode, a cathode and at least an inner and an outer control grid, coupling circuits between the outer control grid of each thermionic tube and the inner control grid of the other thermionic tube for determining the relaxation operation of said circuit and at least one polarized relay having a winding in the anode circuit of each of said tubes whereby current flow through the two tubes alternately serves to energize the windings while the effect of the inductance of said relay on the voltages which determine the relaxation operation is reduced.

10. A relaxation circuit as claimed in claim 9 wherein two polarized relays are provided and opposite windings of each of the two relays are included in the anode circuit of each of the two valves.

11. A circuit arrangement as claimed in claim 3 wherein said switching means comprise a pair of relays, contacts of said relays establishing a current flow alternately through two halves of the primary winding of the first transformer while the windings of the relays are alternately energized under the control of the multivibrator circuit.

12. A circuit arrangement for generating alternating current signals for telephone exchanges comprising a multivibrator circuit, a circuit tuned to the desired frequency of the alternating current signal, switching means controlled by said multivibrator for generating a signal in said tuned circuit, means for adjusting the repetition frequency of said multivibrator to a value slightly different than the desired frequency and a feedback connection from said tuned circuit to said multivibrator which, in conjunction with said adjusting means, causes the repetition frequency of the multivibrator to be adjusted to the desired frequency.

References Cited in the file of this patent

UNITED STATES PATENTS

| | | |
|---|---|---|
| 1,347,894 | Chubb | July 27, 1920 |
| 1,725,053 | Brown et al. | Aug. 20, 1929 |
| 1,956,353 | James | Apr. 24, 1934 |
| 2,208,400 | Steinmetz | July 16, 1940 |
| 2,210,576 | Fitch | Aug. 6, 1940 |
| 2,225,907 | Duguid | Dec. 24, 1940 |
| 2,276,660 | Krom | Mar. 17, 1942 |
| 2,335,512 | Herrick | Nov. 30, 1943 |
| 2,375,158 | Wills | May 1, 1945 |
| 2,436,482 | Miller et al. | Feb. 24, 1948 |
| 2,436,808 | Jacobsen et al. | Mar. 2, 1948 |
| 2,501,520 | Skellett | Mar. 21, 1950 |
| 2,555,872 | Carpentier | June 5, 1951 |

FOREIGN PATENTS

| | | |
|---|---|---|
| 583,996 | Great Britain | Jan. 3, 1947 |